United States Patent Office 3,671,304
Patented June 20, 1972

3,671,304
PROCESS FOR FLAMEPROOFING AND
RESULTANT PRODUCT
Vladimir Mischutin, Hackensack, N.J., assignor to
Arkansas Company, Inc., Newark, N.J.
No Drawing. Filed Apr. 23, 1970, Ser. No. 31,398
Int. Cl. C09d 5/18; C09k 3/28
U.S. Cl. 117—136
16 Claims

ABSTRACT OF THE DISCLOSURE

There is provided a novel type of fireproofing composition for cellulosic and synthetic materials suitable for textile use and methods of preparing and utilizing said compositions. The novel compositions are prepared by mixing either a polyalkylenimine or the reaction product of a polyalkylenimine with an amide, with a halo alkyl phosphate ester under aqueous conditions. The materials are proofed by immersion into an aqueous solution, suspension or emulsion of the proofing composition and dried at an elevated temperature.

DESCRIPTION OF THE PRIOR ART

Flameproofing agents for cellulosic and synthetic materials fall into numerous categories. Included among these agents are those which depend for their proofing action on the presence of phosphorus compounds and also those which comprise halogenated moieties.

Prominent among the phosphorus containing agents are those which appear to depend for their fireproofing action on the presence of phosphorus-nitrogen bonds. As an example may be cited the composition produced by mixing polyethylenimines with pentaerythritol tetraorthophosphate. In order to achieve retention of the proofing on the fabric the impregnated fabric must be treated with melamine prior to the heat drying step.

Further examples of phosphorus-containing agents which also include halogenated moieties are the ammonium salts of polyhalopropyl phosphate acid esters used in conjunction with amino resins derived from formaldehyde.

SUMMARY OF THE INVENTION

There is provided a novel type of flameproofing composition for cellulosic and synthetic materials derived from polyalkylenimines and haloalkyl phosphate esters wherein the hydrocarbon portion of the ester moiety is bonded to nitrogen atoms in the polyalkylenimine moiety with the elimination of the halogen as hydrogen halide or derivatives thereof.

The agents of the present invention utilize as starting material either polyalkylenimines or the reaction product thereof with an amide or N-substituted derivatives thereof.

The reaction of these primary components bonds the amide or derivatives thereof to some of the primary or secondary amino groups of the polyalkylenimine moiety with the elimination of ammonia.

The thus obtained starting material is then mixed with a solution or suspension of the haloalkyl phosphate ester. A partial reaction is believed to occur at this stage, since color changes are noted. If desired a surfactant may be added at this stage.

It is interesting to note that while the mixed components are stable for months under ambient conditions in aqueous solution, the mixture of the same components in anhydrous media leads to a reaction of explosive violence. Thus it is presumed that the interaction of the components in an aqueous media is of a different nature.

The cellulosic or synthetic material to be proofed is immersed in the aqueous suspension, solution or emulsion thus obtained. The excess aqueous medium is then removed from the material which is then dried and subjected to heat treatment at moderately elevated temperatures.

The material thus treated shows satisfactory flame resistance and moreover retains this characteristic after washing.

DESCRIPTION OF THE PREFERRED EMBODIMENTS

In the process of producing the flame resistant and fire proofing agents of the present invention, there is utilized as starting material a polyalkylenimine derived from a monomer of general formula

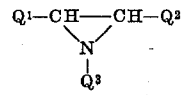

wherein $Q^1$, $Q^2$ and $Q^3$ may be the same or different and may be hydrogen or lower alkyl of 1 to 4 carbon atoms, preferably 2–4 carbon atoms. Said polymer has a molecular weight in the range of 600–100,000, preferably 40,000 to 60,000 for natural and synthetic textile materials, paper, paper fabrics and other non-woven fabrics, and about 1000 to about 2000 for carpets. Especially preferred is the polymer derived from the monomer wherein $Q^1$, $Q^2$ and $Q^3$ are hydrogen, namely polyethylenimine. Such a polymer has the general formula $(C_2H_5N)_p$ (wherein $p$ is an integer) and has a random distribution of primary, secondary and tertiary amino moieties. It has been found, although the invention is not limited thereby, that the approximate ratio of primary, secondary and tertiary groups is 1:2:1.

In the preferred modification of the invention the polyethylenimine is reacted with an amide with the elimination of ammonia. Among the amides within the scope of the invention are lower alkyl amides of 1–5 carbon atoms, such as formamide, acetamide, propionamide and the like; acrylamide; urea and mono and di-substituted urea, wherein the substituents are lower alkyl of 1–5 carbon atoms, benzyl, phenyl or halophenyl and are located on one nitrogen atom only; sulfamic acid, sulfamide, ammonium and alkali metal salts of sulfamic acid, amides of phosphoric, phosphorus and polyphosphorus acids and Victamide, a reaction product of anhydrous ammonia and phosphorus pentoxide commercially available from the Victor Chemical Works and described in detail in U.S. Pat. 2,122,122. The reactants are heated in water under reflux from 1 to 8 hours, the actual reaction time depending on the reactivity of the amide. The reaction with sulfamic acid is very rapid, with formamide from 2 to 3 hours and urea 5 to 6 hours. The primary reaction product is then mixed with an aqueous solution, suspension or emulsion of a halo- or polyhaloalkyl phosphate ester. If desired, a surfactant, preferably a non-rewetting nonionic type, may be added at this stage. Isopropanol and isobutanol may also be used in this case to serve as penetrating or wetting agents.

The proportions of polyalkyleneimine and amido materials are adjusted in such a manner as to partially react the primary and secondary amino groups of the polyalkyleneimine, leaving unreacted amino sites which will be utilized for cross-linking of the polymer with a suitable coreactant.

The preferred phosphate esters fall into five classes:

(1) Water soluble ammonium salts of halo- and polyhalo-alkyl phosphoric acid esters of the general formula

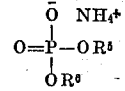

wherein $R^5$ and $R^6$ may be the same or different and may be alkyl, preferably of 1–5 carbon atoms such as methyl, ethyl, propyl, butyl, or pentyl; haloalkyl, or polyhaloalkyl wherein the moiety may include up to four halogen atoms, provided at least the oxygen bonded methylene moiety is unhalogenated, where the halogens are selected from the group consisting of fluorine, chlorine, bromine or iodine and the alkyl moiety contains 1–5 carbon atoms; or aryl preferably halo aryl, such as chloro and bromo phenyl; provided further that at least one member of the group $R^5$ and $R^6$ is halogenated.

(2) Tris (haloalkyl) phosphite of general formula

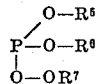

wherein $R^5$ and $R^6$ are as above, $R^7$ has the same value as $R^4$; and $R^5$, $R^6$ and $R^7$ may be the same or different provided all contain at least one halogen moiety each.

(3) Tris (haloalkyl phosphates of the general formula

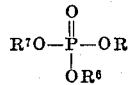

wherein $R^5$, $R^6$, and $R^7$ are as above and may be the same or different provided all contain at least one halo moiety each.

(4) Tris (isohaloalkyl) phosphates of the general formula

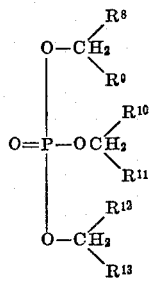

wherein $R^8$ thru $R^{13}$ may be the same or different and are loweralkyl or lowerhaloalkyl or polyhalo alkyl of one to four carbon atoms, wherein the halo groups are as above, provided that $R^8$, $R^{10}$ and $R^{12}$ all contain at least one halo moiety each.

(5) The condensation product of a tris (loweralkyl) phosphate with $PCl_3$ and ethylene oxide known commercially as Phosgard® (manufactured by Monsanto Chemical Co. Inc.) having the general formula

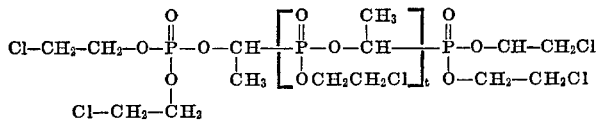

where $t$ is an integer from 0 to 5.

In the process of preparing the proofing agents of the present invention there are prepared aqueous solutions or suspensions containing from 30 to 50 and preferably about 40 parts (in all cases by weight herein) of the polyethylenimine or polyethylenimine-amide condensate, per 100 parts of water.

There is also prepared an aqueous solution, suspension or emulsion containing from about 35 to about 65 parts of haloalkyl phosphate ester per 100 parts of aqueous solution. To this latter mixture is added a surfactant, preferably a nonionic surfactant. There is utilized from 0.5 to 2.0% and preferably about 1% of surfactant (based on the weight of the solution), and if isopropanol or isobutanol is used as the surfactant, 2–4% and preferably about 3% of the alcohol (based on the weight of the solution) is used.

Where the phosphate ester is water-insoluble or substantially so (ester groups 2–5 and above), it is preferred to utilize an emulsifier which is dissolved in the phosphate ester with agitation and slight heating. Any nonionic emulsifier may be used, however, it has been found useful to employ a mixture of mono- and di-glycerides of fatty acids together with a polyoxyalkylene stearate, suitably polyoxyethylene stearate. There is utilized from about 10 to about 25 parts of emulsifier per 100 parts of phosphate ester. It is, however, preferred to use the minimum amount of emulsifier which will produce a satisfactory emulsion. If necessary the alkalinity is adjusted by the addition of alkali to keep it in the range of pH 9–11.

The polyalkylenimine or polyalkylenimine-amide adduct solution is then slowly added to the phosphate ester solution with agitation. Where the phosphate ester is in the form of an emulsion, mixing in a high speed, high sheer mixer is highly desirable. There may be utilized from 20 to 40 parts, and preferably about 30–35 parts of the imine to from 80 to 60, and preferably from about 60–70 parts of the phosphate ester based on dry weight of each component.

The resultant product may be used in the concentration thus obtained, or it may be diluted with from 50 to 150 parts of water per 100 parts of solution.

The substrate to be treated is immersed in the resutlant solution, to ensure complete impregnation and the excess solution removed, suitably by pressing between rollers or the like. The treated substrate is then air dried at between 100° and 120° C. and then baked at 125° to 160° C. for from 3 to 5 minutes. The substrates which may be treated by this method include cellulosic materials such as cotton, linen, rayon, cellulose acetate and paper. Also included are synthetic fibers such as polyesters and acrylics.

The substrate may be in the form of filaments, yarn, thread, fibers, woven, knitted or printed fabrics and nonwoven fabrics. The amount of dry pickup will vary with the physical properties of the substrate which has been found to be in the range of 20% to 40% for cellulosic materials and much lower in the range of 5% to 15% for synthetics. The impregnated substrates obtained by this method are resistant to removal of the flameproofing agent by water leaching, by washing or shampooing and by dry cleaning in a solvent system.

Example I (A)

To 100 parts of a 33% solution of polyethyleneimine having a molecular weight of 40,000–60,000, 25 parts of water were added obtaining a solution containing between 26% and 27% total solids. This solution was designated I–A.

(B)

The procedure of part A was repeated, replacing the polyethyleneimine with a 33% solution of polypropyleneimine having a molecular weight between 20,000 and 30,000. This solution was designated I–B.

Example II 53.4 parts of bis 2,3-dibromopropyl phosphate were dissolved in 36.6 parts of water by addition of 5 parts of a 30% solution of ammonium hydroxide, forming the bis 2,3-dibromopropyl ammonium phosphate. To this solution 5 parts of a 50% solution of nonionic surfactant was added. This solution was designated solution II.

Example III 100 parts of Solutions I–A and I–B, respectively, were mixed with 100 parts of Solution II. At this stage a white precipitate was formed which was redissolved by the addition of 15 parts of a 25% solution of ammonium chloride. This mixture was diluted to approximately 30% by addition of 50 parts water. Pieces of a bleached undyed 8.5 ounce cotton twill were impregnated with each solution and the excess solution removed by squeezing between two rollers.

The wet pickup was 90% and after drying at 100°–120° C. and subsequently baking at 140°–150° C. for 3 to 5 minutes, the fabric contained about 27% dry add-on. After rinsing in cold water and drying at 95° C. the treated fabrics were submitted to various tests. It was noted that the fabric was somewhat discolored and was quite stiff when compared to the untreated material. As a result of these treatments the fabric was made flameproof giving an average char length of about 4 inches when submitted to AATCC Test Method 34–1966. Also the tensile strength was 20% higher than the untreated fabric as determined by ASTM Method D 1682–64 with no adverse effect on the tear strength as determined by ASTM Method D 1424–63. Samples of the treated fabrics were submitted to laundering (AATCC Test Method 61–1968-Test No. II–A). After drying the fabrics gave an average char length of about 4.5 inches with no after flame or afterglow (AATCC Test Method 34–1966). No increase in flammability was found after repeated laundering tests up to ten times. Samples of the treated fabrics were also submitted to dry cleaning (AATCC Test Method 86–1968).

The average char length of the dry cleaned samples was 4.5 inches with no after flame or afterglow. Repeated dry cleanings had no adverse effect on flammability.

Example IV

To 100 parts of a 33% solution of polyethylenimine having a molecular weight of between 40,000 and 60,000—33 parts of urea dissolved in 100 parts of water are added. The mixture is placed in a flask equipped with a reflux condenser and agitator and heated to the boil. At this point reaction begins as indicated by the liberation of ammonia gas. The mixture is heated under reflux with agitation for additional six hours. Upon cooling there is obtained 228 parts of a polyethylenimine urea condensate and residual $NH_4OH$, containing 27% solids. This solution is designated solution IV–$A^1$.

In accordance with the above procedure, but in place of urea there may be utilized formamide, acetamide, propionamide, N-methylurea, N-diethylurea, N-benzylurea, N-phenyl urea, N-p-chlorophenyl urea, acrylamide, sulfamic acid, sulfamide, ammonium sulfamate, sodium sulfamate, phosphoramide, phosphordiamide, polyphosphoric amide and polyphosphoric triamide to produce polyethylenimine-amide condensate solutions designated as IV–$A^2$—IV–$A^{18}$ respectively.

Example V 100 parts of solution IV–$A^1$ is mixed with 100 parts solution II resulting in a solution containing 40% total solids. This solution is diluted to about 30% by addition of about 67 parts of water.

A piece of 3.3 ounce bleached cotton is impregnated in the above solution. The excess is removed by squeezing between two rollers. The wet pickup is 100%. After drying at 100°–120° C. the fabric contains 30% dry add-on. After rinsing in cold water and drying at 95° C. the fabric was submitted to various tests.

The material was flameproof giving an average char length of about 4 inches when submitted to the vertical flammability test (AATCC 34–1966) (also the tensile strength of the treated material was 20% higher than the untreated material as determined using ASTM Method D–1682–64 with no adverse effect on the tear resistance of the samples as determined by ASTM Method D–1424–63).

No discoloration or change in color of the treated samples was observed when compared to the untreated material.

Example VI

A piece of kraft paper was impregnated in a solution prepared using 50 parts each of Solutions IV–$A^1$ and II and 100 parts of water. The excess solution was removed by squeezing between two rollers to a 125% wet pickup. After drying at a temperature between 105° and 120° C. on a steam heated drying can, the sample had a 25% dry add-on. The treated paper was flameproof, giving an average char length of about 4 inches with no afterglow or after flame when submitted to the vertical flammability test (TAPPI Method T 461 M–48) and retained its nonflammable characteristics, even after leaching 60 minutes in distilled water at room temperature and in boiling distilled water for 5 minutes, giving a char length of about 4.5 inches when submitted to the vertical flammability test. (TAPPI Method T461 M–48). The wet, dry and bursting strengths of the paper was increased by about 50% with the treatment with no adverse effect on the tear strength.

Example VII

To 33 parts of a 99% pure polyethylenimine having an average molecular weight of 1200, 38 parts of formamide dissolved in 120 parts of water were added. This solution was then heated to the boil in a flask equipped with reflux condenser and agitator and refluxed under agitation for 3 hours, to drive off the ammonia generated in the reaction. After this period 162 parts of a solution containing 27% solids are obtained. This solution is designated VII–A.

Five parts of solution VII–A were mixed with 5 parts of Solution II and diluted to 100 parts by additional of water.

Samples of high pile carpeting made from acrylic fiber and also polyester fiber were impregnated in this solution, removing the excess by squeezing between two rollers. The wet pickup varied between 120 and 150% and the dry add-on, determined by weighing the samples after drying at 110° to 130° C., was between 4 and 6%, and had a soft non-tacky hand, and were non-flammable when a 7.5 grain methenamine pill was placed on them and ignited with a match as described in 15 CFR Part 7. After complete combustion of the pill the charred surface did not exceed one inch in diameter. The carpet samples retained their flame resistance even after 25 repeated home type shampooings.

Example VIII 100 parts of an ammonium salt of an amidopolyphosphate obtained by reaction between ammonia and phosphorous pentaoxide as described in U.S. Pat. No. 2,122,122, also known under the commercial name of "Victamide," were dissolved in 200 parts of water at 70° C. After cooling a water clear solution was obtained which contained approximately 33% solids. This solution was mixed with a 33% solution of polyethyleneimine having a molecular weight between 60,000 and 100,000 in a flask equipped with agitator and reflux condenser. This mixture was now slowly heated to the boil with strong agitation. At this point reaction began as evidenced by the liberation of ammonia gas. The mixture was maintained at the boil for three hours at which point no more ammonia was evolved indicating completion of the reaction. Upon cooling 590 parts of a viscous clear solution containing approximately 33% solids, was obtained. This solution was designated VIII.

100 parts of solution II were now mixed with 81 parts of solution VIII. A white precipitate was formed which was redissolved by addition of 15 parts of a 25% solution of ammonium chloride and then 4 parts of a nonionic surfactant were added. This solution was designated VIII–A.

60 parts of solution VIII–A were diluted with 40 parts of water.

A piece of non-woven fabric made from regenerated cellulose was impregnated in this solution and the excess squeezed off between two rollers to a wet pickup of 130% and the fabric was dried on an electrically heated plate until bone dry. The dry add-on was 31%. The fabric did not discolor, retained its original soft hand and was flame resistant giving a char length of about 4.5 inches with no afterglow or after flame when submitted to the Vertical Flammability Test (AATCC 34–1966). The fabric was flameproof even after leaching in distilled water at room temperature for 60 minutes, giving the same char length.

Example IX

To 100 parts of sulfamic acid suspended in 100 parts of water, 300 parts of a 33% polyethyleneimine solution having a molecular weight of 40,000 to 60,000 were added. The mixture was brought to the boil under agitation in a flask equipped with a reflux condenser. In this case no ammonia was liberated since the ammonia formed in the reaction was neutralized by the sulfamic acid forming ammonium sulfamate. The mixture was refluxed for about two hours forming a light yellow viscous liquid containing about 42% total solids. This product was designated as I–A$^{11}$ (refer to Example I).

The following emulsions of water insoluble phosphorus compounds were prepared.

| Emulsions | B$^1$ | B$^2$ | B$^3$ | B$^4$ |
|---|---|---|---|---|
| Tris (2,3 dibromopropyl) phosphate | 40 | | | |
| Tris (2,3 dichloropropyl) phosphate | | 40 | | |
| Tris (β chloroethyl) phosphate | | | 40 | |
| Phosgard $^a$ | | | | 40 |
| Emulsifier System $^b$ | 6 | 6 | 6 | 6 |
| Water | 54 | 54 | 54 | 54 |
| Total | 100 | 100 | 100 | 100 |

$^a$ Phosgard is described as a reaction product of phosphorus trichloride, ethylene oxide, and trialkyl phosphate.
$^b$ The Emulsifier System is formed by mixing: 33 parts of a mixture of mono and diglyceride of an edible fat, 66 parts polyoxyethylene stearate.

The emulsions were designated emulsion IX–B$^1$, IV–B$^2$, IX–B$^3$, and IX–B$^4$ are prepared in the following manner:

The emulsifiers are dissolved in the phosphorus compound with agitation and slight heating.

In accordance with the foregoing procedure there may be produced emulsions from tris (2-bromoethyl) phosphite tris (chloromethyl) phosphite, tris (1-bromo-3-chloro propyl) phosphate, tris (1-iodobutyl-2-yl) phosphate, which are designated emulsions IX–B$^5$—IX–B$^8$ respectively.

32 parts of Product I–A$^{11}$ were added to 70 parts of the above emulsions, namely IX–B$^1$, IX–B$^2$, IX–B$^3$, IX–B$^4$, respectively, under mixing in a high-speed, high-shear mixer. Then to 50 parts of each of the above mixtures, 50 parts of water were added.

Samples of a 5 ounce cotton fabric were saturated with each of the solutions described above and squeezing between two rolls to remove excess solution. The wet pick-up averaged 120% and the dry add-on averaged 25%. All samples were flameproof giving a char length of about 4 inches when submitted to AATCC Test Method 34–1966, and remained non-flammable after repeated launderings and repeated dry cleanings in a charged system.

Also the treated goods were not discolored and the hand was highly satisfactory.

Although the invention has been described above with reference to certain preferred and illustrative embodiments thereof, it will be appreciated by those skilled in the art that it is susceptible of many variations within the scope of the appended claims.

What is claimed is:

1. A process for flameproofing cellulosic or synthetic materials which comprises:
    (a) immersing the material in an aqueous solution or suspension of a composition produced by reacting a polyalkylenimine of M.W. 600 to 100,000 with an amide in such manner as to partially react the primary and secondary amino groups of the polyalkylenimine leaving unreacted amino sites and then reacting the reaction product with a haloalkyl or haloaryl ester of a phosphorous acid in an aqueous medium;
    (b) removing excess liquid therefrom; and
    (c) drying at between 90 and 140° C.

2. A process according to claim 1, wherein the amide is selected from the group consisting of urea; lower alkyl amides of 1–5 carbon atoms; and mono and disubstituted urea wherein the substituents are lower alkyl groups of 1–5 carbon atoms, benzyl, phenyl or halophenyl, and are located on one nitrogen atom only; sulfamic acid, acrylamide, ammonium and alkali metal salts of sulfamic acid; phosphoric and phosphorous mono- di- and tri-acid amides; and poly phosphoric acid mono- di- and tri-amides.

3. A process according to claim 1, wherein the ester is selected from the group consisting of tris (2,3-dichloropropyl) phosphate
tris (2,3-dibromopropyl) phosphate
tris (β-chloroethyl) phosphate and a poly (alkylene chloro ethyl phosphate) having the general formula $$Cl-CH_2-CH_2-O-\overset{O}{\underset{\underset{Cl-CH_2-CH_2}{|}}{P}}-O-CH-\left[\overset{O}{\underset{\underset{OCH_2CH_2Cl}{|}}{P}}-O-\overset{CH}{\underset{CH_3}{|}}-\right]_t\overset{O}{P}-O-CH-CH_2Cl\\ \underset{O-CH_2-CH_2Cl}{|}$$

where $t$ is an integer from 0 to 5.

4. A process according to claim 3, wherein the amide is urea.

5. A process according to claim 3, wherein the amide is formamide.

6. A process according to claim 3, wherein the amide is sulfamic acid.

7. A process according to claim 3, wherein the ester is tris (2,3-dibromopropyl) phosphate and the amide is polyethylenimine-sulfamic acid condensate.

8. A process according to claim 3, wherein the ester is bis (2,3-dibromopropyl) phosphate and the amide is polyethylenimine-sulfamic acid condensate.

9. A normally combustible material comprising fibers or filaments composed a material selected from the group consisting of cellulosic and synthetic materials, flameproofed according to the method of claim 1.

10. A normally combustible material comprising fibers or filaments composed a material selected from the group consisting of cellulosic and synthetic materials, flameproofed according to the method of claim 2.

11. A normally combustible material comprising fibers or filaments composed a material selected from the group consisting of cellulosic and synthetic materials, flameproofed according to the method of claim 3.

12. A normally combustible material comprising fibers or filaments composed a material selected from the group consisting of cellulosic and synthetic materials, flameproofed according to the method of claim 4.

13. A normally combustible material comprising fibers or filaments composed a material selected from the group consisting of cellulosic and synthetic materials, flameproofed according to the method of claim 5.

14. A normally combustible material comprising fibers or filaments composed a material selected from the group consisting of cellulosic and synthetic materials, flameproofed according to the method of claim 6.

15. A normally combustible material comprising fibers or filaments composed a material selected from the group consisting of cellulosic and synthetic materials, flameproofed according to the method of claim 7.

16. A normally combustible material comprising fibers or filaments composed a material selected from the group consisting of cellulosic and synthetic materials, flameproofed according to the method of claim 8.

(References on following page)

References Cited

UNITED STATES PATENTS

| | | | |
|---|---|---|---|
| 2,268,556 | 1/1942 | Adams et al. | 117—136 |
| 2,470,042 | 5/1949 | McLean et al. | 117—136 X |
| 2,472,335 | 6/1949 | McLean et al. | 117—136 X |
| 2,711,998 | 6/1955 | Weaver et al. | 260—29.4 |
| 2,668,294 | 2/1954 | Gilpin | 117—155 UX |
| 2,919,288 | 12/1959 | Pohlemann et al. | 260—944 |
| 3,112,154 | 11/1963 | Steinhauer | 117—136 X |
| 2,677,681 | 5/1954 | Gill | 117—154 X |
| 3,448,075 | 6/1969 | Clark et al. | 106—15 X |
| 3,403,118 | 9/1968 | Listner | 106—15 X |
| 3,563,793 | 2/1971 | Brandeis et al. | 117—143 X |

OTHER REFERENCES

Barber et al., "A Study of Fire Retardancy . . .," Am. Dye. Rptr., pp. 40–44, May 6, 1968.

WILLIAM D. MARTIN, Primary Examiner

H. J. GWINNELL, Assistant Examiner

U.S. Cl. X.R.

117—138.8 UA, 138.8 F, 140 A, 143 A, 145, 155 UA; 252—8.1